No. 717,969. PATENTED JAN. 6, 1903.
G. CARLSON.
CHOCOLATE COATING MACHINE.
APPLICATION FILED APR. 29, 1902.
NO MODEL. 3 SHEETS—SHEET 1.

Witnesses:
J. D. Garfield
M. J. Grover

Inventor:
Gabriel Carlson
by Chapin & Lee
Attorneys.

No. 717,969. PATENTED JAN. 6, 1903.
G. CARLSON.
CHOCOLATE COATING MACHINE.
APPLICATION FILED APR. 29, 1902.
NO MODEL. 3 SHEETS—SHEET 3.

Witnesses: Inventor,
Gabriel Carlson
by Chapin & Co.
Attorneys.

UNITED STATES PATENT OFFICE.

GABRIEL CARLSON, OF SPRINGFIELD, MASSACHUSETTS.

CHOCOLATE-COATING MACHINE.

SPECIFICATION forming part of Letters Patent No. 717,969, dated January 6, 1903.

Application filed April 29, 1902. Serial No. 105,201. (No model.)

*To all whom it may concern:*

Be it known that I, GABRIEL CARLSON, a citizen of the United States of America, residing at Springfield, in the county of Hampden and State of Massachusetts, have invented new and useful Improvements in Chocolate-Coating Machines, of which the following is a specification.

This invention relates to confectionery-machines, and specifically to machines for coating confections with liquid chocolate, and it is in the nature of an improvement on Letters Patent of the United States issued to E. P. F. Magniez on August 13, 1901, and numbered 680,489.

The object of this invention is to provide a machine which will be free from certain objections which a commercial use of prior constructions has developed therein, notably in connection with the means for carrying the chocolate-blanks through that part of the machine wherein they are drenched with liquid chocolate, it having been found that the under side of the blanks cannot be coated so uniformly that the lighter-colored blank forming the core will not show through the chocolate coating to a greater or less extent.

A further object of this invention is to provide improved means for elevating the chocolate from the heating and mixing reservoir to a point from whence it may flow in a thin stream over the confections as they pass through the latter.

Figure 1:
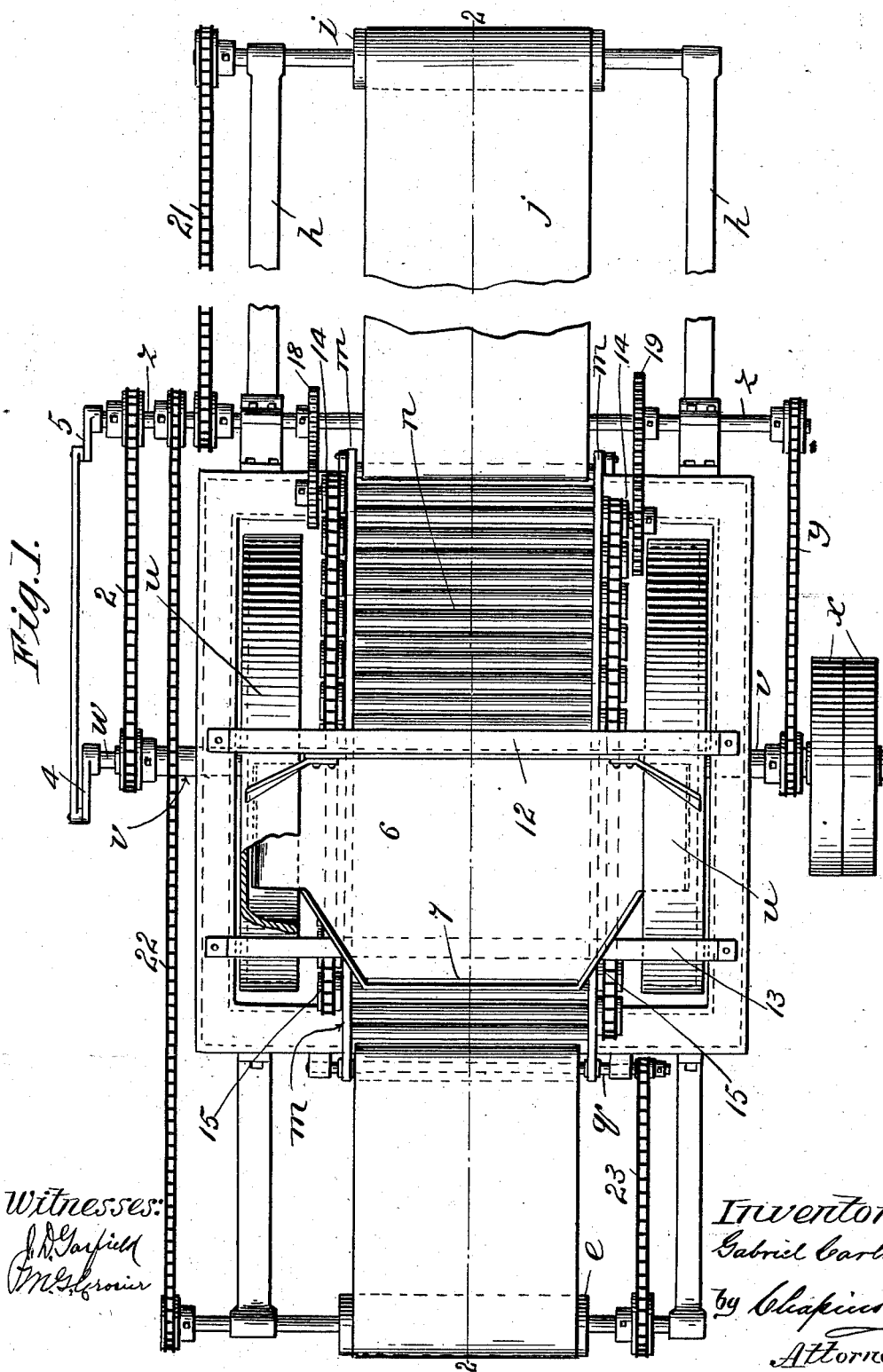
Figure 2:
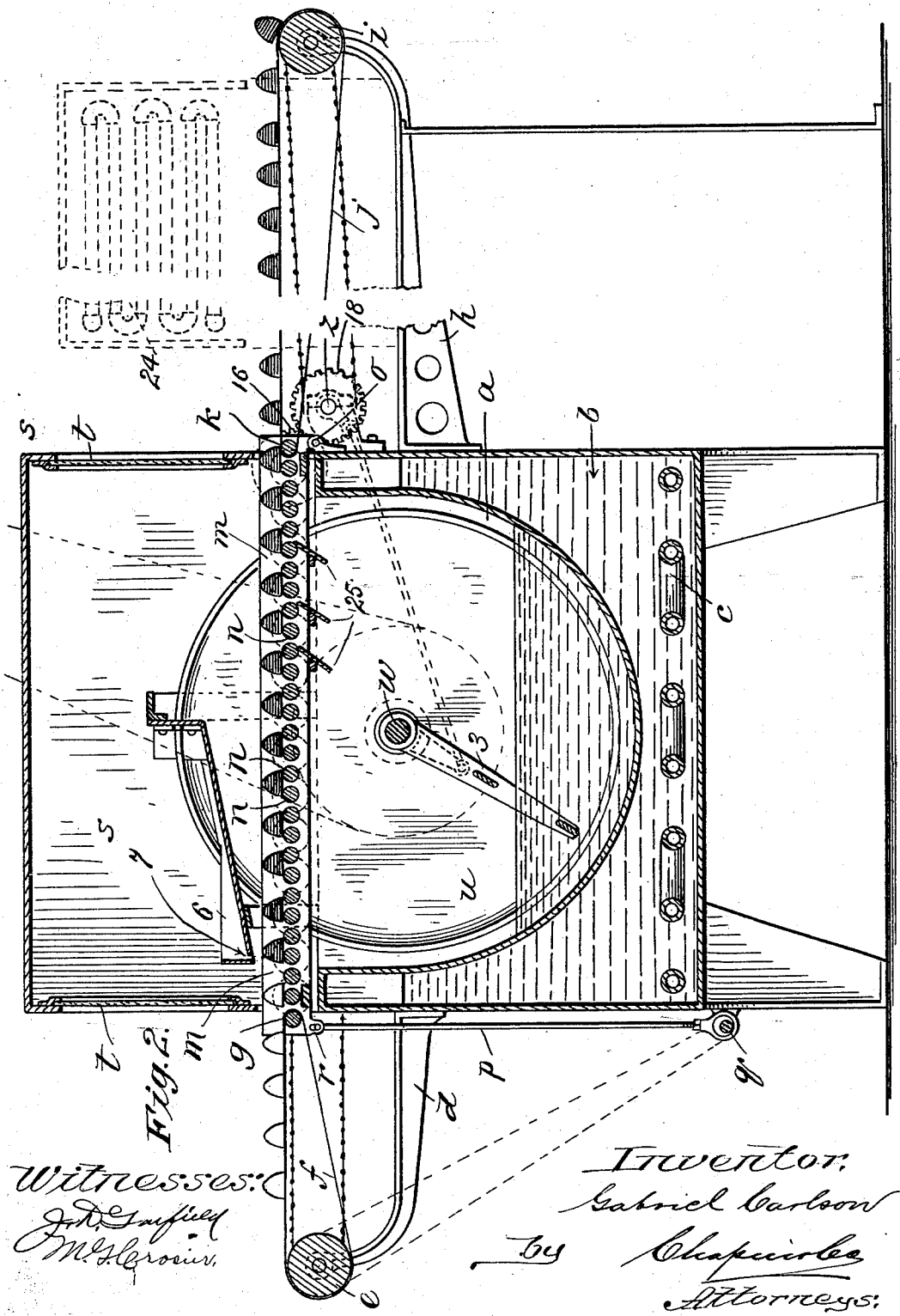
Figure 3:
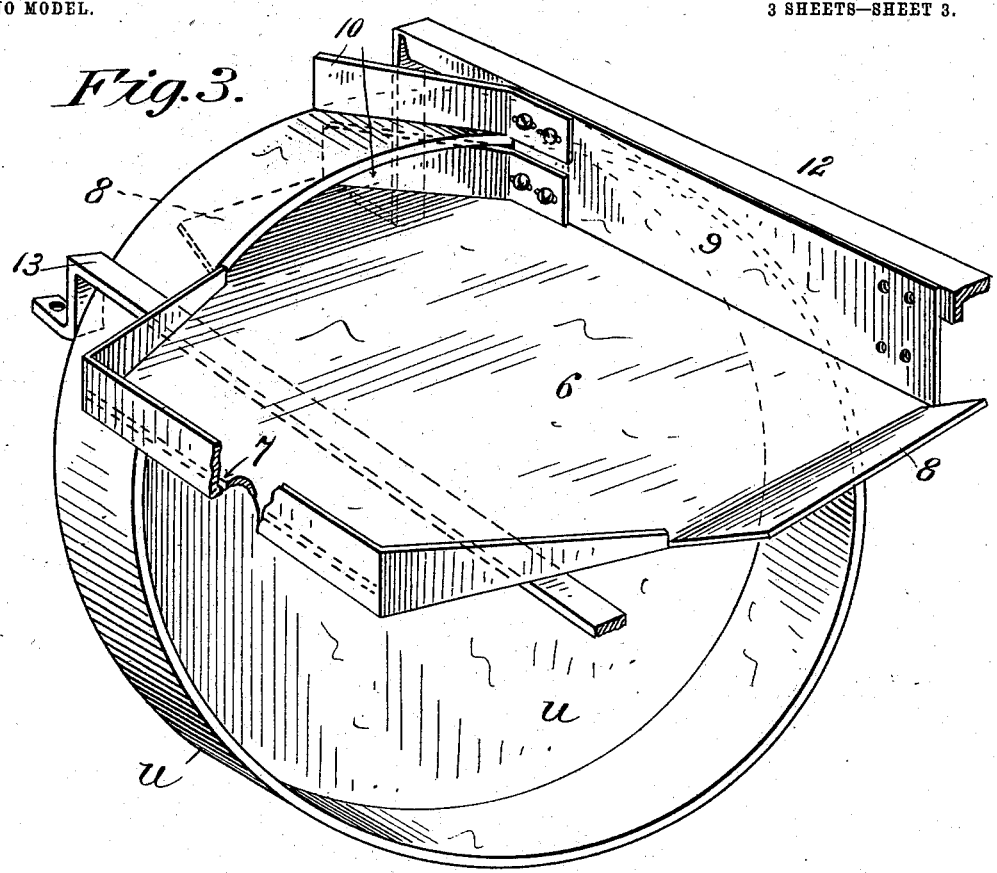
Figure 4:
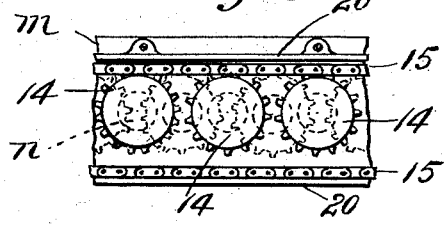
Figure 5:

In the drawings forming part of this application, Figure 1 is a plan view, with some parts broken away, of a machine embodying my invention, the cover of the upper part thereof being removed. Fig. 2 is a sectional elevation on line 2 2, Fig. 1. Fig. 3 is a perspective view of one of the chocolate-elevating devices and a receptacle for the chocolate. Fig. 4 is a detail of the conveying-roll in end elevation. Fig. 5 is a side view of a part of one of the conveyer-rolls, showing a change in the construction thereof.

This machine consists of a chocolate-kettle $a$, immersed in a water-tank $b$, to which heat is applied by a steam-pipe $c$, located therein, or to which heat may be applied in any other convenient manner whereby a uniform temperature may be maintained in the chocolate mixture. This water tank or reservoir $b$ constitutes practically the main-frame part of the machine, and there is bolted thereto a bracket $d$ on one end of said frame for the support of a roll $e$, over which there runs a feed-apron $f$, the opposite end of which is supported on a small shaft $g$. On the opposite end of the machine is another bracket $h$, supporting the roll $i$, over which runs a delivery-apron $j$, the end thereof next the machine being supported on a shaft $k$, like the inner end of the feed-apron $f$. The two aprons $f$ and $j$ have their upper surfaces located in the same horizontal plane and are made of thin enameled cloth or some similar material.

There extends across the machine between the inner ends of the aprons $f$ and $j$ a frame $m$, which is substantially of the same width as said aprons and which has supported therein transversely of the line of movement of the apron a series of closely-placed rolls or rotating shafts $n$, whose upper peripheries are in the same plane substantially as the upper surface of the feed and delivery aprons. These rolls $n$ have substantially the same diameter as the shafts $g$ and $k$, over which these rolls run, and the feed-aprons $f$ and the rolls $n$ constitute a continuous and connected conveyer mechanism comprising three separate though interconnected parts. The rolls $n$ are placed so near together that they constitute a practically continuous moving surface.

If it is desired on account of the size of the pieces of confectionery to be coated that the feed and delivery aprons should approach as closely as possible to the rolls $n$ at each end of the frame $m$, then the round shafts $g$ and $k$ may be replaced by a plate having a thin edge over which the apron may run, whereby the latter may be brought into closer proximity to the upper edge of said end rolls.

In the specification and claims the word "shaft" will be used to designate the member around which the apron is drawn.

The frame $m$ is hinged to the machine at $o$ and normally rests on the top of the latter, and connected with the feed end thereof is a rod $p$, whose lower end has an eccentric connection with the shaft $q$, which is suitably rotated, as will be described farther on. The upper end of the rod $p$ is turned at right angles thereto to enter a vertical slot *r* in the frame *m* just under the shaft *g*, the length of this slot, however, being less than the degree of eccentricity of the connection of the lower end of the rod, and therefore each revolution of the shaft *q* will cause the end of the rod *p* to strike a sharp blow against the upper end of the slot *r* during one part of the movement of the eccentric, thus lifting the frame, which is dropped again onto the machine when the eccentric has completed its cycle.

The speed of rotation of the shaft *q* may be so regulated as to give the frame *m* sufficiently rapid vibration in a vertical plane to attain the desired result without jarring it to an extent which would displace the confections thereon. The object of this jolting movement is to shake the surplus chocolate mixture from the blanks, leaving only a thin coating thereon.

The rolls or rotating shafts *n* are all given rotative movement in the same direction and at the same speed substantially as that of the aprons *f* and *j*, whereby these elements form a continuous conveyer mechanism from outside of the machine on one side to a point outside of it on the opposite side.

There is a cover *s* which fits over the upper part of the machine and is at each end provided with glass doors *t*, through which the operation in the machine may be watched and by means of which access may be had to the interior. The frame *m*, which supports the conveyer-rolls, is considerably narrower than the top of the machine, as seen by a glance at Fig. 1. This is for the purpose of permitting the location on each side of the frame *m* of two cup-shaped disks *u*, the flanges of which lie next to the sides of the frame. These two disks are of such diameter as to submerge about one-quarter of their area in the chocolate-kettle *a*, the latter being practically semicircular in cross-section, and these disks *u*, having a diameter only slightly less than that of the kettle, are fitted into each end thereof and are rotated on bushings *v* on the shaft *w*, which extends through the machine, which bushings are secured to the sides of the machine. On this bushing *v* on one side of the machine there are mounted the driving-pulleys *x*, whereby through a sprocket-chain or other suitable driving connection *y* a shaft *z* is rotated, which is located on the end of the machine transversely thereof in suitable bearings. From the opposite end of this shaft by another sprocket-chain 2 connection is made with the other bushing *v*, whereby both of the disks *u* may run in unison. The shaft *w* has mounted thereon between the disks *u* a paddle-frame 3, and a crank 4 on the end of the shaft *w* is by a suitable rod connected with a crank 5 on the shaft *z*, which crank is of smaller radius than the crank 4, to the end that the revolution of the smaller crank 5 may impart to the shaft *w* oscillating or rocking movements, whereby the paddle 3 may swing back and forth in the chocolate mixture, keeping it well stirred. The lower portions of the disks *u* being submerged in the chocolate mixture, the adhesive nature of said mixture causes it to cling to the disks and their flanges, and by the revolution of the disks the chocolate may thus be carried upward out of the kettle *a*.

Supported in the machine over the conveyer-rolls *n* is a trough 6, downwardly inclined toward the front end of the conveyer-roll frame *m*, and the lower end of this trough is provided with a slot 7, which is practically as long as the said conveyer-rolls. The upper portions of the sides of this trough 6 are flared outwardly to permit them to fit in under the flanges of the disks *u*, as shown in Fig. 3, said upper portions being indicated by 8. The back of the trough consists of a vertical wall 9, to which the scrapers 10 are secured, one bearing against each side of the flange of the disk and both being pitched forwardly from the inner edge of the flange toward the outer against the direction of rotation of the disk, whereby the chocolate adhering to this flange may be scraped off and run into the trough. This trough is carried on two supports 12 and 13, which are bolted to the top of the reservoir *b*, which, as stated, constitutes practically the main-frame part of the machine.

The conveyer-rolls *n* are rotated as follows: Commencing from one end of the frame *m*, each of these rolls *n* has one of its ends only projecting through the frame *m* sufficiently far to take a small sprocket-wheel 14. The next roll to it projects from the opposite side of the frame and is also provided with its sprocket, and each alternate roll is thus treated. Over these sprockets on both sides of the frame *m* there runs a chain 15, and outside of the sprocket on the first roll *n* at the delivery end of the frame *m* there is secured a gear 16, and a similar gear 17 is secured to the opposite end of the second roll, both of these rolls being positively rotated by gear connections with the shaft *z* through gears 18 and 19, meshing with gears 16 and 17. It is thus seen that alternate rolls are driven from each side of the machine by the chains 15. As shown in Fig. 4, suitable guide-strips 20 may be screwed to the frame *m* of the machine to keep this chain 15 in operative engagement with the sprockets, if desired, and the rolls *n* instead of being, as shown, made with smooth surfaces may be corrugated, as shown in Fig. 5, whereby less surface will bear on the under side of the confections. From the shaft *z* a suitable chain or other driving connection 21 rotates the roll *i*, and from the same shaft another chain 22 rotates the roll *e*, and from the shaft on which this latter roll is supported a chain 23 runs down to the shaft *q*, on which the rod *p* is eccentrically supported. The delivery-apron *j* may be extended to whatever length may be found necessary to give time for the proper hardening of the chocolate mixture before the confections are dropped over the end of the apron for packing.

For the purpose of facilitating the hardening of the chocolate mixtures a cooling-chamber (indicated by 24 and shown in Fig. 2 only) is located so that the chocolates on the delivery-apron may run through it.

It is clear from the foregoing description that when the machine is started a continuous supply of chocolate will be fed into the trough 6, which will run through the slot 7 down onto the rolls $n$, near the feed end of the frame, covering any blank confections thereon, and through these rolls down again into the chocolate-kettle $a$. Meanwhile the feed-apron $f$ and the rolls $n$ and the feed-apron $j$ are all slowly moving in the same direction. The frame in which the feed-rolls are supported has a jarring movement vertically applied thereto.

The fact that the aprons $f$ and $j$ each run over a support in close proximity to one of the rolls $n$ at opposite ends of the frame assures the delivery of the blanks from the feed-apron to the conveyer-rolls and from the latter to the delivery-apron without interruption, notwithstanding the fact that the frame $m$ has imparted to it the vertical jarring movement referred to. This movement to a slight degree is also imparted to these two aprons, but more especially to the feed-apron.

The theory of the operation of this machine is that as the liquid chocolate drenches the blanks as they move slowly under the stream flowing through the slit 7 of the trough 6 the chocolate will adhere to the blanks and to a greater or less extent work onto the under side of the blanks. The rolls also become drenched with chocolate, and as the blanks progress through the machine this chocolate is being constantly rolled onto the under side of the blank, the temperature of the chocolate gradually decreasing, and by the time the chocolates are ready to pass onto the delivery-apron the under side thereof has become well covered and sufficiently "set" to prevent the weight of the blank from forcing its way through the coating on the bottom after it reaches the delivery-apron, and thus leave a white spot where the blank shows through the chocolate.

Beneath two or more of the rolls near the delivery ends of the frame $m$ there are located the scrapers 25, which may be set up into contact with these rolls or one or more of them to scrape the chocolate therefrom if it is found that the under side of the blanks is being too thickly coated, for if a smooth roll be presented to the under side of a chocolate some of it will adhere to the roll.

Heretofore belts of some textile material have been used to elevate the liquid chocolate from the kettle to the trough, the belt running between scrapers on the latter, whereby the adhering chocolate would be scraped off into the trough; but these have been found not durable, and, further, they carry more material when the surface thereof has become more or less worn than when the belts are comparatively new. Still another objection is the difficulty of properly cleaning the belts. The use of the smooth flanged disks herein described overcomes all these objections.

Having thus described my invention, what I claim, and desire to secure by Letters Patent of the United States, is—

1. A chocolate-coating machine comprising a kettle, a frame located over the top of the latter, a series of parallel rolls supported in close proximity in said frame by their extremities, and means for rotating said rolls in the same direction; a feed-apron for delivering blanks to be coated onto one end of said roll-frame, a delivery-apron for receiving said blanks at the opposite end of said frame, a slotted trough over the receiving end of the roll-frame, means for delivering liquid chocolate from said kettle to said trough, and means for imparting movement to the feed and delivery aprons.

2. In a chocolate-coating machine, a kettle, a frame located transversely of the latter, and rolls mounted in said frame in close relation one to the other; means for rotating said rolls; a disk located on each side of said frame whose lower border enters the chocolate in the kettle and whose upper border lies above said frame; a trough above the frame having a slit therein extending transversely of the latter; scrapers on the trough for bearing on said disks and means for rotating said disks and said rolls.

3. In a chocolate-coating machine, a kettle, a frame supported thereover, parallel rolls in said frame in close proximity one to another, a transverse shaft near each end of said frame, a feed-apron at one end running over one of said shafts, and a delivery-apron at the other end running over the other shaft, and means for imparting endwise movements to said aprons, and rotative movements to said rolls in the same direction, combined with devices for delivering a stream of chocolate onto said rolls.

4. In a chocolate-coating machine, a frame, rolls mounted therein in close relation to one another, one end on each roll projecting alternately through opposite sides of the frame, sprockets on said projecting ends, a chain running over said sprockets on each side of the frame, and means for rotating the last two sprockets at one end of the frame, combined with a chocolate-kettle over which the frame is supported, and means for directing a stream of chocolate through the rolls on said frame.

5. In a chocolate-coating machine, a kettle, a frame located transversely of and over the latter, and rolls mounted in said frame in close parallel relation one to the other; means for rotating said rolls; a trough above the frame having a slit therein parallel with the rolls in said frame; means for delivering liquid chocolate from said kettle into said trough, and means for imparting a jolting movement to said roll-carrying frame.

6. In a chocolate-coating machine, a kettle, a series of parallel rolls supported in a suitable frame over said kettle, the rolls lying in close proximity one to another, a feed-apron to deposit confections on said rolls at one end of said frame, a delivery-apron to receive the confections from said rolls at the other end of the frame, devices for delivering a stream of chocolate onto said rolls, one or more scrapers adapted to bear against said rolls, together with means for imparting endwise movement to the aprons and rotative movements to the rolls in the same direction.

GABRIEL CARLSON.

Witnesses:
K. I. CLEMONS,
WM. H. CHAPIN.